(12) United States Patent
Garrett et al.

(10) Patent No.: US 7,730,382 B2
(45) Date of Patent: Jun. 1, 2010

(54) METHOD AND SYSTEM FOR MANAGING MEMORY IN A COMMUNICATION SYSTEM USING HYBRID AUTOMATIC REPEAT REQUEST (HARQ)

(75) Inventors: David Garrett, Santa Clara, CA (US); Trevor Pearman, Santa Clara, CA (US); Brett Schein, Santa Clara, CA (US); Tony O'Toole, Santa Clara, CA (US)

(73) Assignee: BECEEM Communications Inc., Santa Clara, CA (US)

( * ) Notice: Subject to any disclaimer, the term of this patent is extended or adjusted under 35 U.S.C. 154(b) by 848 days.

(21) Appl. No.: 11/633,840

(22) Filed: Dec. 4, 2006

(65) Prior Publication Data

US 2007/0263739 A1 Nov. 15, 2007

Related U.S. Application Data

(60) Provisional application No. 60/741,597, filed on Dec. 2, 2005.

(51) Int. Cl.
*H03M 13/00* (2006.01)
(52) U.S. Cl. ...................................... 714/762; 714/748
(58) Field of Classification Search ................. 714/762, 714/748
See application file for complete search history.

(56) References Cited

U.S. PATENT DOCUMENTS

| | | | | |
|---|---|---|---|---|
| 5,563,895 A * | 10/1996 | Malkamaki et al. | ......... | 714/748 |
| 5,574,979 A * | 11/1996 | West | ......................... | 455/63.1 |
| 5,805,854 A * | 9/1998 | Shigeeda | ..................... | 714/719 |
| 5,844,918 A * | 12/1998 | Kato | .......................... | 714/776 |
| 6,161,160 A * | 12/2000 | Niu et al. | ..................... | 714/805 |
| 6,710,958 B2 * | 3/2004 | Wyatt | .......................... | 714/762 |
| 7,269,152 B2 * | 9/2007 | Vukovic et al. | ............. | 370/332 |
| 7,330,432 B1 * | 2/2008 | Revsin et al. | ............... | 714/821 |
| 7,522,528 B2 * | 4/2009 | Fellman et al. | ............. | 714/746 |
| 2003/0123389 A1 * | 7/2003 | Russell et al. | ............... | 370/230 |
| 2005/0201325 A1 * | 9/2005 | Kang et al. | .................. | 370/328 |
| 2006/0039299 A1 * | 2/2006 | Ihm et al. | .................... | 370/254 |

* cited by examiner

*Primary Examiner*—M. Mujtaba K Chaudry

(57) ABSTRACT

A method and system for managing memory using Hybrid Automatic Repeat Request in a communication system is provided. The method includes storing a retransmitted burst in a memory. The retransmitted burst includes plurality of bits. One or more of memory address of the retransmitted burst and the information corresponding to the retransmitted burst is recorded in a location table. The location table records memory addresses and the information corresponding to a plurality of bursts stored in the memory. The method further includes determining one or more preceding bursts corresponding to the retransmitted burst stored in the memory using location table. Thereafter, a combined burst is generated using the retransmitted burst and one or more preceding burst, if one or more preceding bursts corresponding to the retransmitted burst are stored in the memory. The combined burst includes the plurality of bits.

22 Claims, 5 Drawing Sheets

METHOD AND SYSTEM FOR MANAGING MEMORY IN A COMMUNICATION SYSTEM USING HYBRID AUTOMATIC REPEAT REQUEST (HARQ)

RELATED APPLICATION DATA

This application claims priority to and incorporates by reference U.S. application Ser. No. 60/741,597 filed on Dec. 2, 2005, titled H-ARQ Memory Management.

BACKGROUND OF THE INVENTION

The present invention relates to Hybrid Automatic Repeat Request (HARQ) communication systems. More particularly, the present invention relates to a method for managing memory using Hybrid Automatic Repeat Request (HARQ) in a communication system.

In communication systems, data is transmitted between a transmitter and a receiver in form of bursts. To improve the quality of the data being received, error control techniques, such as, Forward Error Correction (FEC) and Automatic Repeat Request (ARQ) are used. The object of ARQ is to increase the reliability of data transmission, while FEC techniques fix errors using an error correction code. HARQ uses each of FEC and ARQ for increasing reliability of data transmitted and to further enhance data throughput rates.

In conventional HARQ communication systems, the receiver on receiving a burst stores the bursts in a memory. An FEC decoder in the receiver performs an error correction decoding and transmission error check on each burst. Examples of the transmission error check, may include, but are not limited to, Cyclic Redundancy Check (CRC). The burst may be self-decodable, which may not require error correction decoding. If each bit in the burst is error free, then ARQ facilitates sending of an Acknowledgement (ACK) to the transmitter. However, if one or more bits in the burst have error, then a Negative Acknowledgement (NACK) is sent to the transmitter.

If a NACK is received for a burst, the transmitter sends a retransmission for the burst. The receiver may soft combine the retransmission with the burst to generate a combined burst. A Signal/Noise (S/N) ratio of each bit in the combined burst is higher than the S/N ratio of a corresponding bit in each of the burst and the retransmission for the burst. A transmission error check is performed on the combined burst and if one or more bits in the combined burst have error, then a NACK is sent to the transmitter for the retransmitted burst. This is repeated until a burst in which each bit is error free is generated or until the maximum number of retransmissions is reached. Moreover, several bursts are transmitted simultaneously from the transmitter. Additionally, several ACK/NACK are received by transmitter, which retransmits a burst for every corresponding NACK.

As a result, a large amount of memory is required for storing bursts and their corresponding retransmissions. The older bursts cannot be stored for longer duration of time as memory space required for storing the retransmissions often leads to space constraints. Additionally, typical H-ARQ memory management schemes uses a fixed number of queues for data transfer and each such queue has a fixed size corresponding to maximum possible burst size. This may lead to fragmentation of memory space, which may require considerable amount of system resources for de-fragmentation. Moreover, fixed number of queues and their fixed size limits the number of bursts to be sent across at a particular instance and the size of each burst to be sent across to the receiver. Further, the number of retransmissions that can be sent are restricted.

There is therefore a need for methods and systems for efficient memory management in an HARQ system which enables unlimited retransmissions.

SUMMARY

An embodiment provides methods and systems for managing memory using a Hybrid Automatic Repeat Request (HARQ) in a communication system.

Another embodiment provides methods and systems for dynamically sizing queues in a memory using HARQ and enabling unlimited retransmissions.

Yet another embodiment provides methods and systems for maintaining the history of bursts stored in the memory in a location table.

Another embodiment provides methods and systems for storing bursts in receiver memory till a memory constraint occurs.

Embodiments described below include methods and systems for managing memory using HARQ in a communication system. The methods include storing a retransmitted burst in a memory. The retransmitted burst includes plurality of bits. One or more of memory address of the retransmitted burst and the information corresponding to the retransmitted burst is recorded in a location table. The location table records memory addresses and the information corresponding to a plurality of bursts stored in the memory. The method further includes determining one or more preceding burst corresponding to the retransmitted burst, stored in the memory, using location table. Thereafter, a combined burst is generated using the retransmitted burst and one or more preceding bursts, if one or more preceding bursts corresponding to the retransmitted burst are stored in the memory. The combined burst includes a plurality of bits.

BRIEF DESCRIPTION OF DRAWINGS

A more complete appreciation of the present invention is provided by reference to the following detailed description when considered in conjunction with accompanying drawing in which reference symbols indicate the same or similar components, wherein.

DETAILED DESCRIPTION OF THE DRAWINGS

Various embodiments described herein provide methods and systems for managing memory using Hybrid Automatic Repeat Request (HARQ) in a communication system. The communication system may be a High Speed Downlink Packet Access (HSDPA) system. The memory is managed by using a location table for storing history of a plurality of bursts stored in the memory. A retransmitted burst transmitted for a burst is stored in the memory and is combined with one or more preceding bursts to generate combined bursts using the location table.

Figure 1:
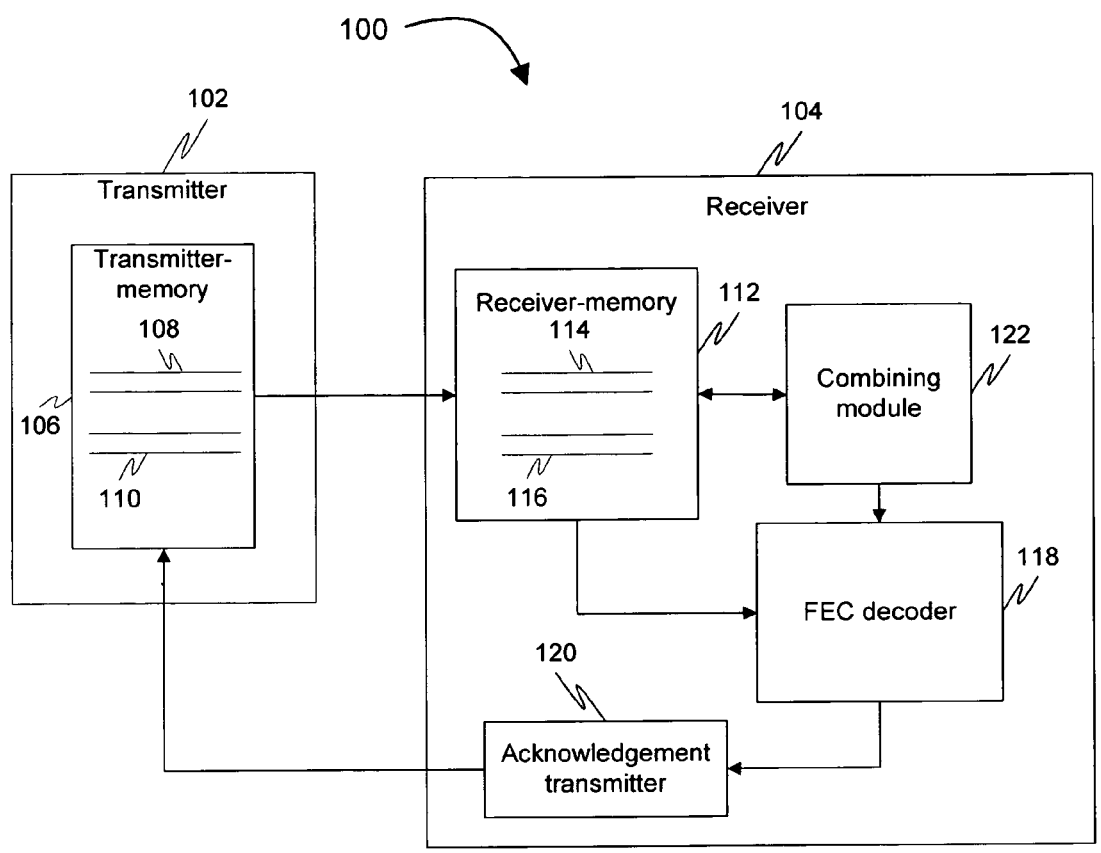
FIG. 1 is block diagram showing an exemplary environment in which various embodiments can function.

FIG. 1 is a block diagram showing an exemplary environment 100 in which various embodiments of the invention function. Environment 100 includes a transmitter 102 and a receiver 104. Transmitter 102 sends data to receiver 104 in the form of a plurality of bursts. The plurality of bursts is stored in a transmitter-memory 106 of transmitter 102. Transmitter-memory 106 stores the plurality of bursts in one or more of a queue 108 and a queue 110. It will be apparent to people skilled in the art that transmitter-memory 106 may include more than two queues. The plurality of bursts may include a first burst and a second burst. The first burst, for example, may be stored in queue 108 and the second burst, for example, may be stored in queue 110.

A burst transmitted from a queue of transmitter-memory 106 is received by a corresponding queue in a receiver-memory 112 of receiver 104. For example, the first burst transmitted from queue 108 is received by a queue 114, which corresponds to queue 108, in receiver-memory 112. Similarly, the second burst transmitted from queue 110 is received by a queue 116, which corresponds to queue 110, in receiver-memory 112. It will be apparent to people skilled in the art that receiver-memory 112 may include more than two queues. After receiving a burst and storing the burst in receiver-memory 112, a Forward Error Correction (FEC) decoder 118 in receiver 104 decodes the burst to determine if each bit of the burst is error free by performing a transmission error check on the burst. The transmission error check, for example, may be a cyclic Redundancy Check (CRC). Thereafter, FEC decoder 118 communicates with an acknowledgement transmitter 120 and prompts it to send a Negative Acknowledgement (NACK) for the burst if one or more bits of the burst have error and an ACK if each bit of the burst is error free. Accordingly, acknowledgement transmitter 120 sends a NACK or an ACK for the burst to transmitter 102. Thereafter, transmitter 102 sends a retransmission for the burst, if a NACK is received for the burst.

In case the burst is a retransmitted burst and one or more preceding bursts corresponding to the retransmitted burst are stored in receiver-memory 112, a combining module 122 combines the retransmitted burst and one or more preceding bursts to generate a combined burst. Combining module 122 stores the combined burst in receiver-memory 112. FEC decoder 118 decodes the combined burst to determine if each bit of the combined burst is error free by performing a transmission error check of the combined burst. FEC decoder 118 may decode the combined burst before combining module 122 stores the combined burst in receiver-memory 112. Thereafter, if one or more bits of the combined burst have error, then combining module 122 stores the combined burst in receiver-memory 112 and FEC decoder 118 communicates with acknowledgement transmitter 120 and prompts it to send a NACK for the retransmitted burst. However, if each bit of the combined burst is error free, then FEC decoder 118 prompts acknowledgement transmitter 120 to send an ACK for the retransmitted burst. Accordingly, acknowledgement transmitter 120 transmits a NACK or an ACK for the retransmitted burst to transmitter 102.

Figure 2:
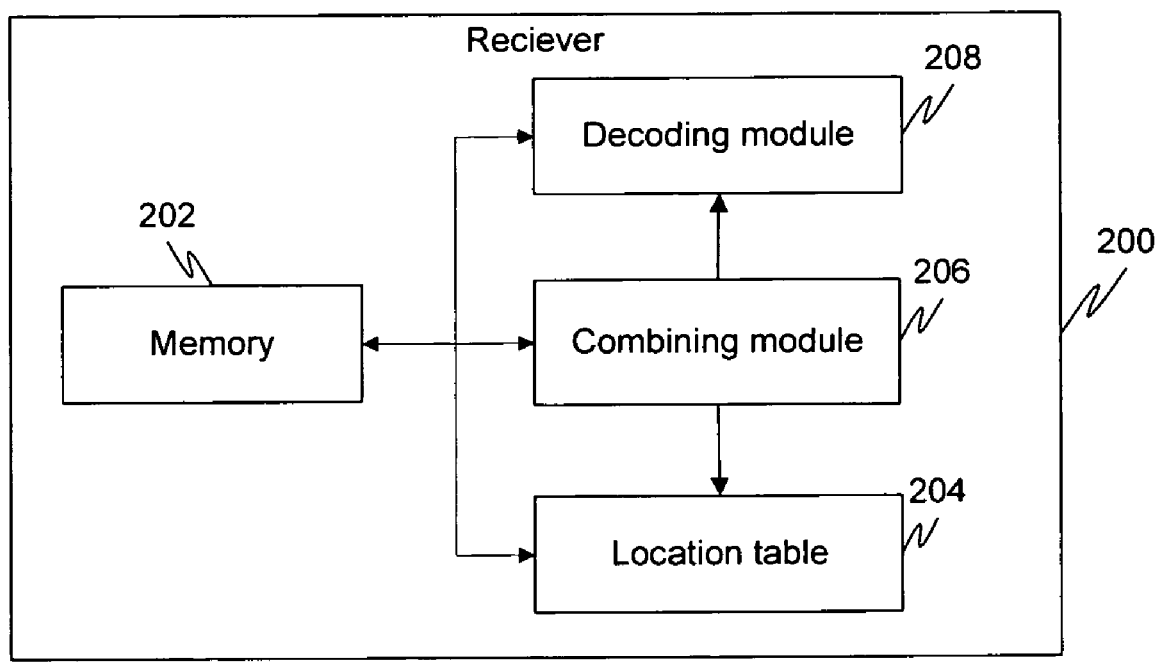
FIG. 2 is a block diagram showing various components of a receiver for managing memory using a Hybrid Automatic Repeat Request (HARQ), in a communication system, in accordance with an embodiment.

FIG. 2 is a block diagram showing various components of a receiver 200 for managing memory using a Hybrid Automatic Repeat Request (HARQ) in a communication system, in accordance with an embodiment. Receiver 200 includes a memory 202 and a combining module 206. Memory 202 receives a plurality of bursts from transmitter 102 and stores the plurality of bursts. Memory 202 may be a queue. The queue has a plurality of memory addresses, which are sequential and distinct, for storing the plurality of bursts received from transmitter 102. The plurality of bursts is stored in the plurality of memory addresses in a sequential manner in order of receiving them from transmitter 102. For example, the queue includes ten memory addresses, i.e., Q1, Q2, Q3, Q4, Q5, Q6, Q7, Q8, Q9, and Q10. In this example, Q2 is sequential Q1, therefore, a first burst received is stored in Q1 and a second burst received after the first burst is stored in Q2. In an embodiment of the invention, the plurality of bursts may not be sequential and may be accessed in a random order to store the plurality of bursts based on the availability of space in the queue. For example, if the first burst is stored in Q1, further, Q2, Q3, and Q4 are occupied, then the second burst may be stored in one of Q5, Q6, Q7, Q8, Q9, and Q10. In an embodiment, memory size in the queue corresponding to each memory address may be varied based on size of an incoming burst. For example, if size of an incoming burst is equal to a sum of memory size in the queue corresponding to each of C1 and C2, then the memory size in the queue corresponding to C1 and the memory size in the queue corresponding to C2 may be combined to store the incoming burst. The queue may be a circular queue. In the circular queue, in addition to the plurality of memory addresses being sequential, a first memory address is sequential to a last memory address. For example, if a circular queue has ten sequential memory addresses, i.e., C1, C2, C3, C4, C5, C6, C7, C8, C9, and C10, then the memory address C1 is sequential to the memory address C10.

After a burst is stored in memory 202, a decoding module 208 in receiver 200 decodes the burst to check a plurality of bits in the burst for errors by performing transmission error check on the burst. Decoding module 208 may be FEC decoder 118. If decoding module 208 detects error in one or more bits of the burst stored in memory 202, then receiver 200 sends a NACK to transmitter 102 requesting a retransmission of the burst.

Thereafter, transmitter 102 transmits a retransmitted burst for the burst to receiver 200. The retransmitted burst includes the plurality of bits. Memory 202 stores the retransmitted burst. If memory 202 is a queue, the retransmitted burst is stored in a predetermined memory address in the queue. The predetermined memory address is an available memory address in the queue sequential to an occupied memory address in the queue. For example, seven memory addresses of the queue, i.e., Q1, Q2, Q3, Q4, Q5, Q6, and Q7 are occupied by bursts. In this case, a last occupied memory is the memory address Q7, and the memory address Q8 is an available memory address sequential to the memory address Q7, therefore, the retransmitted burst is stored in the memory address Q8, which is the predetermined memory address. Storing the retransmitted burst in a memory sequential to an occupied memory address in the queue ensures that the queue is not fragmented. In an embodiment, the retransmitted burst may be stored in an available memory address in the queue that is not sequential to an occupied memory address.

The queue may be the circular queue. In the circular queue, the retransmitted burst is stored as stated above, if there is an available memory address. However, if each memory address in the circular queue is occupied, the retransmitted burst may overwrite a relatively older burst. A burst in a circular queue is a relatively older burst, if the time for which the burst is present in the circular queue is more than a corresponding time for which each burst in the plurality of bursts is present in the circular queue. For example, all the memory addresses of the circular queue, i.e., C1, C2, C3, C4, C5, C6, C7, C8, C9, and C10 are occupied. Further, a burst stored in C1 is the relatively older burst. In this case, the retransmitted burst overwrites the burst stored in C1, which is the relatively older burst. Overwriting relatively older bursts in a circular queue ensures that memory 202 is not fragmented.

Memory 202 records a memory address of the retransmitted burst and the information corresponding to the retransmitted burst in a location table 204. Location table 204 may be a link list or a log-file. Location table 204 records memory addresses and information corresponding to each burst stored in memory 202. The information and memory addresses of each burst in location table 204 may be used to trace and extract a burst stored in memory 202, at a later time in future.

Figure 4:
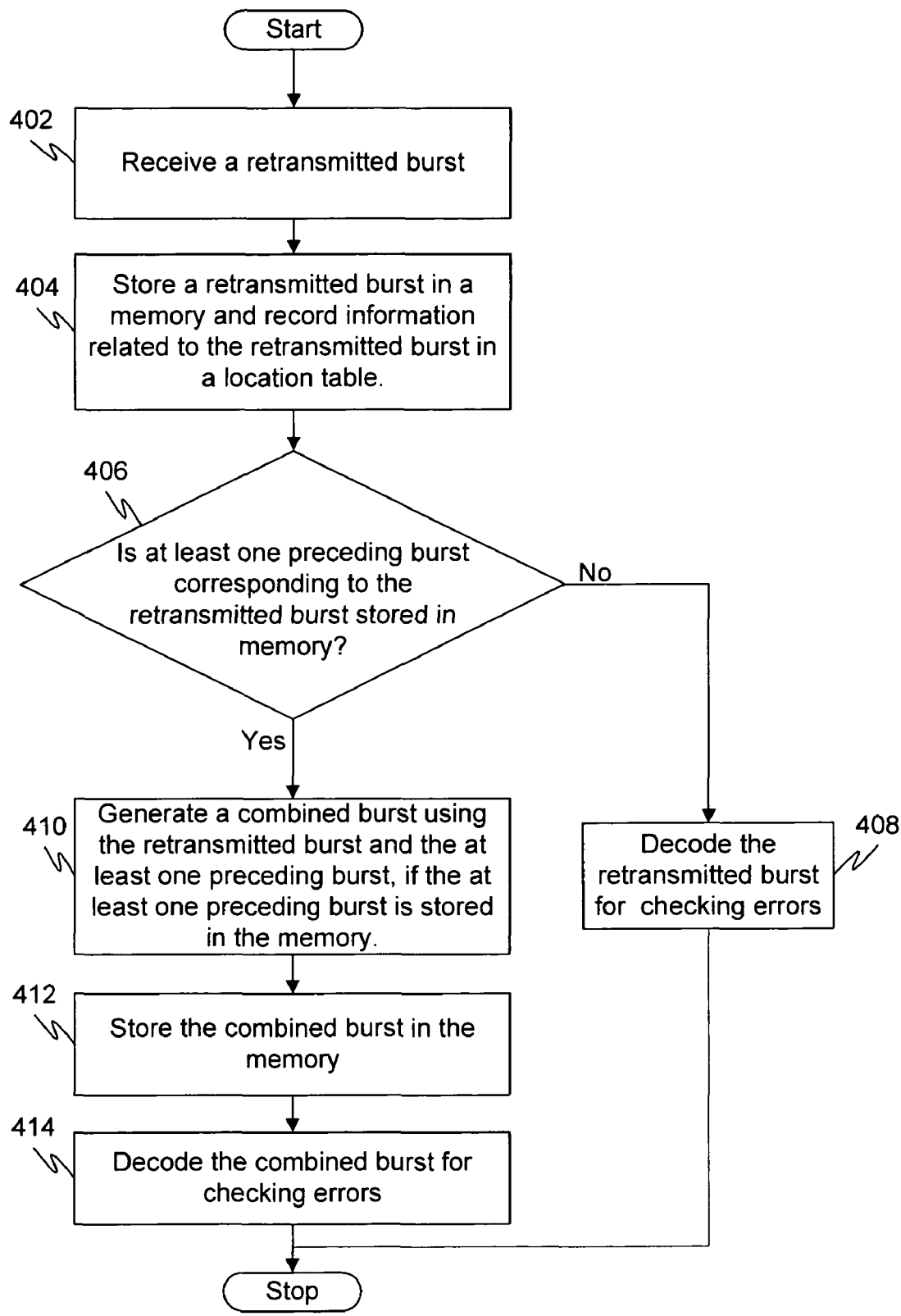
FIG. 4 is a flow chart for managing memory using a Hybrid Automatic Repeat Request (HARQ) in a communication system in accordance with an embodiment.

After memory 202 stores the retransmitted burst, decoding module 208 decodes the retransmitted burst to check each bit in the retransmitted burst for errors, if one or more preceding bursts corresponding to the retransmitted burst are absent in memory 202. Decoding module 208 performs a transmission error check on the retransmitted burst to check each bit for errors. The retransmitted burst is retransmitted for one or more preceding bursts. This is further explained in conjunction with FIG. 4 given below.

However, if one or more preceding bursts corresponding to the retransmitted burst are present in memory 202, combining module 206 generates a combined burst using the retransmitted burst and one or more preceding bursts. Combining module 206 may soft combine the retransmitted burst and one or more preceding bursts to generate the combined burst. The combined burst includes the plurality of bits. Combining module 206 extracts the retransmitted burst from memory 202 using a corresponding memory address stored in location table 204. Additionally, combining module 206 extracts one or more preceding bursts from memory 202 using a corresponding memory addresses stored in location table 204. Thereafter, combining module 206 stores the combined burst in memory 202. This is further explained in conjunction with FIG. 4 given below. Thereafter, decoding module 208 decodes the combined burst to determine if each bit in the combined burst is error free. A transmission error check is performed on the combined burst to check each bit for errors. In an embodiment of the invention, after combining module 206 generates the combined burst, decoding module 208 decodes the combines burst to determine if each bit in the combined burst is error free. Thereafter, combining module 206 stores the combined burst in memory 202.

Memory 202, location table 204, combining module 206 and decoding module 208 of receiver 200 can be coupled and/or connected in any of a variety of combinations as appropriate to a system that includes receiver 200.

Figure 3:
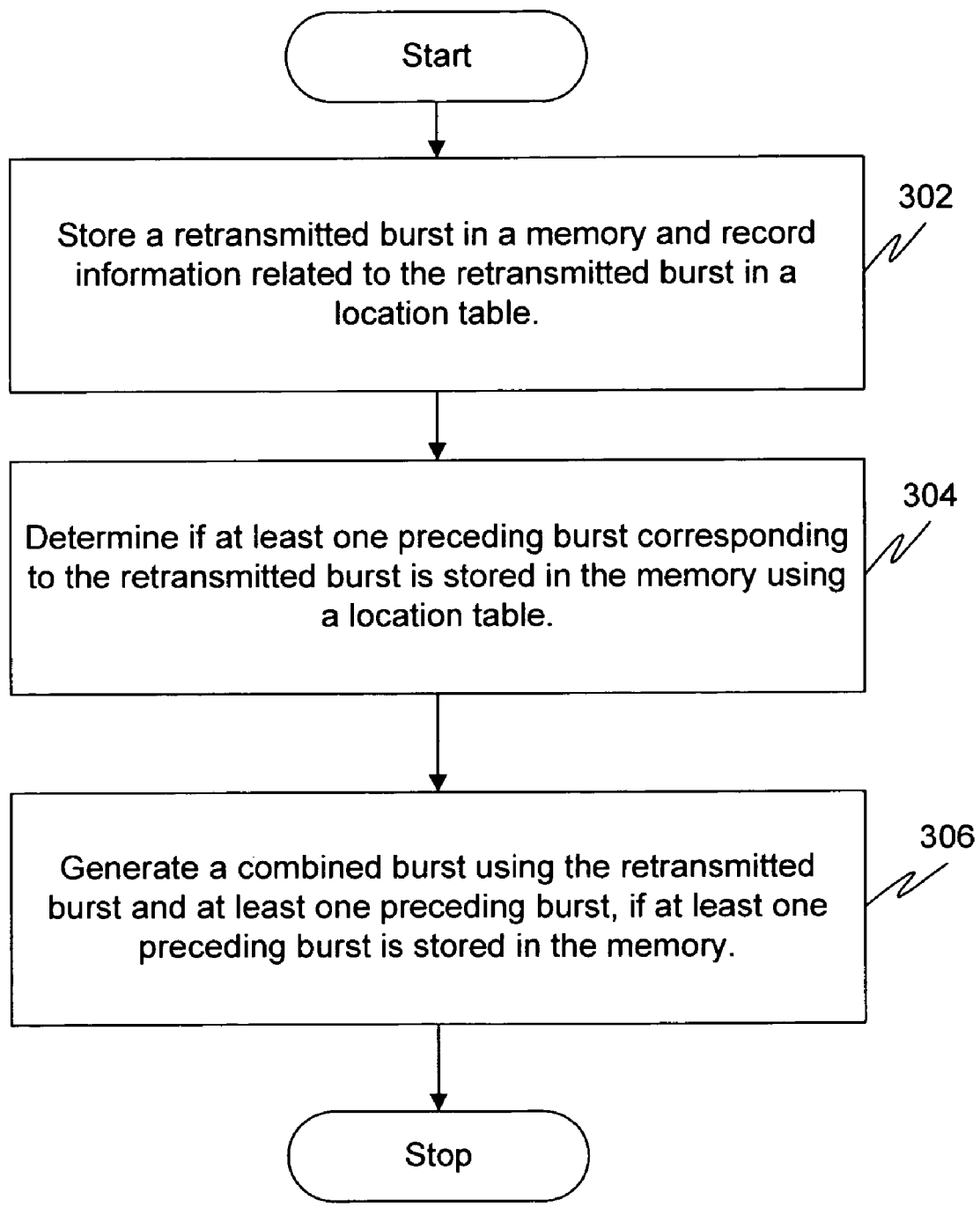
FIG. 3 is a flow chart for managing memory using a Hybrid Automatic Repeat Request (HARQ) in a communication system in accordance with an embodiment.

FIG. 3 is a flow chart for managing memory 202 using a Hybrid Automatic Repeat Request (HARQ) in a communication system in accordance with an embodiment. A burst sent by transmitter 102 is stored in memory 202. Decoding module 208 decodes the burst to check a plurality of bits in the burst for errors by performing transmission error check on the burst. If decoding module 208 detects errors in one or more bits of the burst, receiver 200 sends a NACK to transmitter 102 requesting a retransmission of the burst. In an embodiment, the burst sent by transmitter 102 may be stored in an additional memory (not shown in FIG. 2). Decoding module 208 may decode the burst to check the plurality of bits in the bursts for errors. Thereafter, if one or more bits in the burst have error, then the burst is moved from the additional memory to memory 202 and a NACK is sent to transmitter 102. In response to receiving the NACK, transmitter 102 transmits a retransmitted burst to receiver 200. The retransmitted burst includes the plurality of bits.

At 302, memory 202 stores the retransmitted burst received from transmitter 102 in memory 202. Memory 202 may be a queue. The retransmitted burst is stored in a predetermined memory address in the queue using location table 204. The predetermined memory address is an available memory address in the queue sequential to an occupied memory address in the queue. The queue may be a circular queue. In this case, the retransmitted burst is stored as stated above, if there is an available memory address in the circular queue. However, if each memory address in the circular queue is occupied, the retransmitted burst may overwrite a relatively older burst. A burst in the circular queue is a relatively older burst, if the time for which the burst is present in the circular queue is more than a corresponding time for which each burst in the plurality of bursts is present in the circular queue. This has been explained in conjunction with FIG. 2 above.

In an embodiment, the retransmitted burst may be stored in the additional memory. Thereafter, decoding module 208 decodes the retransmitted burst to check each bit in the retransmitted burst for errors. If one or more bits in the retransmitted burst have error, then the retransmitted burst is moved from the additional memory to memory 202.

Memory 202 records one or more of the memory address of the retransmitted burst and the information corresponding to the retransmitted burst in location table 204. Location table 204 records memory addresses and information corresponding to each burst stored in memory 202. The information and memory addresses of the retransmitted bursts stored in location table 204 may be used to trace and extract a burst, at a later time in future.

At 304, location table 204 is used to determine if one or more preceding bursts corresponding to the retransmitted burst are present in memory 202. The retransmitted burst is retransmitted for one or more preceding bursts. Thereafter, decoding module 208 decodes the retransmitted burst to check each bit in the retransmitted burst for errors, if one or more preceding bursts corresponding to the retransmitted burst are absent in memory 202. This is further explained in detail in conjunction with FIG. 4.

At 306, combining module 206 generates a combined burst using the retransmitted burst and one or more preceding bursts corresponding to the retransmitted burst, if one or more preceding bursts corresponding to the retransmitted burst are available in memory 202. The combined burst includes a plurality of bits. Combining module 206 extracts the retransmitted burst using a corresponding memory address stored in location table 204. Additionally, combining module 206 extracts one or more preceding bursts from memory 202 using a corresponding memory address stored in location table 204. Combining module 206 may soft combine the bursts to generate a combined burst. Thereafter, combining module 206 stores the combined burst in memory 202. This is further explained in detail in conjunction with FIG. 4 given below. While storing the combined burst, the retransmitted burst and one or more preceding bursts corresponding to the retransmitted burst are not removed from memory 202, thereby facilitating their use in future for combining with retransmitted bursts.

Thereafter, decoding module 208 decodes the combined burst to determine if each bit in the combined burst is error free. A transmission error check is performed on the combined burst to determine if each bit in the combined burst is error free. This is further explained in conjunction with FIG. 4.

FIG. 4 is a flow chart for managing memory 202 using a Hybrid Automatic Repeat Request (HARQ) in a communication system, in accordance with an embodiment. At 402, receiver 200 receives a retransmitted burst from transmitter 102. The retransmitted burst is transmitted in response to the NACK transmitted for the burst, in which one or more bits had error.

At 404, memory 202 stores the retransmitted burst sent from transmitter 102. This has been explained in conjunction with FIG. 2 and FIG. 3 given above. Memory 202 records the memory address and the information corresponding to the retransmitted burst in location table 204. At 406, a check is performed on location table 204 to determine if one or more preceding bursts corresponding to the retransmitted burst are available in memory 202. If one or more preceding bursts are absent in memory 202, then at 408 decoding module 208 decodes the retransmitted burst to determine if the plurality of bits in the retransmitted burst is error free. Decoding module 208 performs a transmission error check on the retransmitted burst to check each bit for errors. If each bit in the retransmitted burst is error free, receiver 200 sends an ACK to transmitter 102 for the retransmitted burst. If one or more bits have an error, receiver 200 sends a NACK to transmitter 102 for the retransmitted burst.

Referring back to step 406, if one or more preceding bursts are available in memory 202, combining module 206 generates a combined burst using the retransmitted burst and one or more preceding bursts at 410. The combined burst comprises a plurality of bits. The Signal/Noise (S/N) ratio of each bit in the combined burst is greater than the S/N ratio of a corresponding bit in each preceding burst and the retransmitted burst. Combining module 206 extracts the retransmitted burst using a corresponding memory address stored in location table 204. Additionally, combining module 206 extracts one or more preceding bursts from memory 202 using a corresponding memory address stored in location table 204. Combining module 206 may query location table 204 to obtain a pointer or a reference to the location of the retransmitted burst and one or more preceding bursts from memory 202. Thereafter, combining module 206 may extract the retransmitted burst and one or more preceding bursts using a corresponding pointer/reference.

Thereafter, at 412, combining module 206 stores the combined burst in memory 202 in a memory address sequential to the predetermined memory address in the queue. Combining module 206 may use a pointer or a reference to the predetermined memory address obtained from location table 204 to locate the memory address sequential to the predetermined memory address and store the combined burst in it. Thereafter, location table 204 is updated with the with memory address sequential to the predetermined memory address and information corresponding to the combined burst. While storing the combined burst, the retransmitted burst and one or more preceding bursts corresponding to the retransmitted burst may not be removed from memory 202, thereby facilitating their use in future for combining with retransmitted bursts.

In an embodiment of the invention, combining module 206 may store the combined burst in the predetermined memory address. Combining module 206 may use a pointer or a reference to the predetermined memory address obtained from location table 204 and store the combined burst in the predetermined memory address. Thereafter, combining module 206 may update location table 204 accordingly, such that location table 204 includes information that the predetermined memory address stores the combined burst.

Alternatively, combining module 206 may overwrite the relatively older burst with the combined burst, if each memory address in the circular queue is occupied. The relatively older burst is a burst which is present in the circular queue for a time that is maximum as compared to other bursts stored in the circular queue. Location table 204 may include information corresponding to the time for which each burst is stored in memory 202. Therefore, combining module 206 may query location table 204 to determine the relatively older burst in memory 202 and obtain a pointer or a reference to the memory address storing the relatively older burst. Combining module 206 may use the pointer or the reference to the memory address of the relatively older burst and store the combine burst in the memory address of the relatively older burst. Thereafter, combining module 206 updates location table 204, such that that location table 204 includes information that the memory address of the relatively older burst stores the combined burst.

At 414, decoding module 208 decodes the combined burst to determine if each bit in the combined burst is error free. Decoding module 208 performs a transmission error check on the each bit of the combined burst to check if each bit for errors. If each bit in the combined burst is error free, receiver 200 sends an ACK to transmitter 102 for the retransmitted burst. If one or more bits in the combined burst have an error, receiver 200 sends a NACK to transmitter 102 for the retransmitted burst. In response to receiving the NACK for the retransmitted burst, transmitter 102 sends a retransmission for the retransmitted burst to receiver 200. The retransmission may thereafter be combined with one or more of the combined burst, the retransmitted burst, and one or more preceding bursts corresponding to the retransmitted burst to generate a new combined burst. The S/N ratio of each bit in the new combined burst is greater than the S/N ratio of a corresponding bit in the combined burst.

Figure 5:
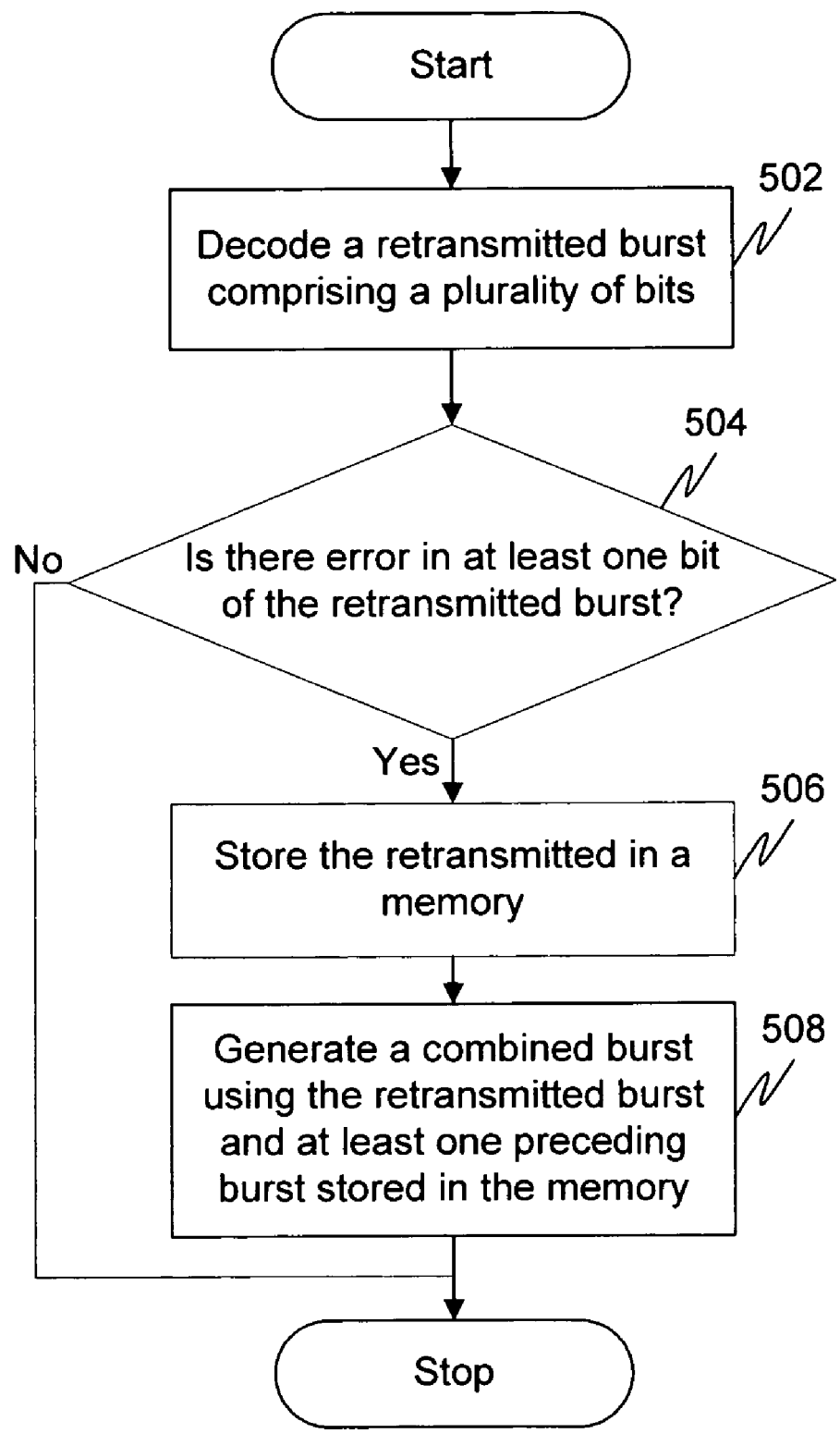
FIG. 5 is a method for managing memory using HARQ in a communication system, in accordance with another embodiment.

FIG. 5 is a method for managing memory using HARQ in a communication system, in accordance with another embodiment. A burst sent by transmitter 102 is stored in an additional memory in receiver 200 (not shown in FIG. 2). Decoding module 208 decodes the burst to check a plurality of bits in the burst for errors by performing transmission error check on the burst. If one or more bits in the burst have error, then the burst is moved from the additional memory to memory 202. Receiver 200 sends a NACK to transmitter 102 requesting a retransmission of the burst. In response to receiving the NACK, transmitter 102 transmits a retransmitted burst to receiver 200. The retransmitted burst includes the plurality of bits.

The retransmitted burst received from transmitter 102 is stored in the additional memory. At 502, decoding module 208 decodes the retransmitted burst to check each bit in the retransmitted burst for errors. A transmission error check is performed on the retransmitted burst to determine if each bit in the retransmitted burst is error free. This has been explained in conjunction with FIG. 4 given above. At step 504, a check is performed to determine if one or more bits in the retransmitted burst have error. Thereafter, if one or more bits in the retransmitted burst have error, then at 506, the retransmitted burst is stored in memory 202. Memory 202 may be a queue. The queue may be a circular queue. Memory 202 records one or more of the memory address of the retransmitted burst and the information corresponding to the retransmitted burst in location table 204. Location table 204 records memory addresses and information corresponding to each burst stored in memory 202. This has been explained in conjunction with FIG. 3 above.

At 508, combining module 206 generates a combined burst using the retransmitted burst and one or more preceding bursts corresponding to the retransmitted burst. The combined burst includes a plurality of bits. Combining module 206 stores the combined burst in memory 202. This has been explained in conjunction with FIG. 3 above. Thereafter, decoding module 208 performs a transmission error check on the combined burst to check each bit for errors. If each bit in the combined burst is error free, receiver 200 sends an ACK to transmitter 102 for the retransmitted burst. If one or more bits in the combined burst have an error, receiver 200 sends a NACK to transmitter 102 for the retransmitted burst. This has been explained in conjunction with FIG. 4 above. In an embodiment, after combining module 206 generates the combined burst, decoding module 208 performs a transmission error check on the combined burst to check each bit for errors. Thereafter, if one or more bits in the combined burst have an error, then combining module 206 stores the combined burst in memory 202 and receiver 200 sends a NACK to transmitter 102 for the retransmitted burst.

Referring back to step 504, if each bit in the retransmitted burst is error free, the retransmitted burst is transmitted further to an system element in the communication system.

Various embodiments of the invention provide methods and systems for managing memory using a Hybrid Automatic Repeat Request (HARQ) in a communication system. A location table is used to record and maintain memory addresses and information corresponding to a plurality of bursts stored in a memory of a receiver. As a result of this, the information and memory addresses of the retransmitted bursts stored in the location table may be used to trace and extract a burst, at a later time in future. The memory may be a queue; therefore the location table can be used to determine an available memory address which is sequential to an occupied memory address. Therefore, the incoming burst may be stored in the available memory address thereby preventing fragmentation of the memory. The bursts in the queue are removed only in case a memory constraint arises, thereby facilitating their use in future for combining with retransmitted bursts. Further, the queue may be a circular queue in which a relatively older burst may be overwritten by incoming burst in the event of space constraint to avoid fragmentation. The features listed above enable dynamic sizing of queues along with a dynamic number of queues and permits unlimited retransmissions from transmitter.

What is claimed is:

1. A method for managing memory using Hybrid Automatic Repeat Request (HARQ) in a communication system, the method comprising:
    storing a retransmitted burst in a memory, wherein the retransmitted burst comprises a plurality of bits, wherein at least one of a memory address of the retransmitted burst and information corresponding to the retransmitted burst is recorded in a location table, wherein the location table records memory addresses and information corresponding to a plurality of bursts stored in the memory;
    determining if at least one preceding burst corresponding to the retransmitted burst is stored in the memory using the location table, wherein the retransmitted burst is retransmitted for the at least one preceding burst; and
    generating a combined burst using the retransmitted burst and the at least one preceding burst, if the at least one preceding burst is stored in the memory, wherein the combined burst comprises the plurality of bits.

2. The method of claim 1, wherein one of the retransmitted burst and the combined burst are stored randomly in an available memory address in the memory using the location table.

3. The method of claim 1, wherein the memory is a queue, the retransmitted burst is stored in a predetermined memory address in the queue using the location table, wherein the predetermined memory address is an available memory address in the queue sequential to an occupied memory address in the queue.

4. The method of claim 3, wherein the combined burst is stored in a memory address sequential to the predetermined memory address in the queue.

5. The method of claim 3, wherein the queue is a circular queue, wherein a first memory address in the circular queue is sequential to a last memory address in the circular queue.

6. The method of claim 4, wherein a memory address storing a relatively older burst is overwritten by one of the retransmitted burst and the combined burst when each memory address in the circular queue is occupied, wherein time for which the relatively older burst is present in the queue is more than a corresponding time for which each burst in the plurality of burst is present in the circular queue.

7. The method of claim 1 further comprising decoding the combined burst to determine if each bit in the combined burst is error free, and performing a transmission error check on the combined burst to determine if each bit in the combined burst is error free.

8. The method of claim 7, wherein an Acknowledgement (ACK) is communicated for the retransmitted burst in response to generation of the combined burst, if each bit in the combined burst is error free.

9. The method of claim 7, wherein a Negative Acknowledgement (NACK) is communicated for the retransmitted burst in response to generation of the combined burst when at least one burst in the combined burst comprises an error.

10. The method of claim 1 further comprising decoding the retransmitted burst to check the retransmitted burst for error when the at least one preceding burst corresponding to the retransmitted burst is absent in the memory, wherein a transmission error check is performed on the retransmitted burst to check each bit for error.

11. The method of claim 1, wherein the retransmitted burst is soft combined with the at least one preceding burst to generate the combined burst.

12. The method of claim 11, wherein the retransmitted burst is extracted from the memory using a corresponding memory address stored in the location table for the retransmitted burst.

13. The method of claim 1, wherein the at least one preceding burst is extracted from the memory using a corresponding memory address stored in the location table for the at least one preceding burst.

14. The method of claim 1, wherein the location table is a link list.

15. The method of claim 1, wherein the communication system is a High Speed Downlink Packet Access (HSDPA) system.

16. The method of claim 1, wherein a Signal/Noise (S/N) ratio of each bit in the combined burst is greater than a S/N ratio of a corresponding bit in each of the retransmitted burst and the at least one preceding burst.

17. A method for managing memory using Hybrid Automatic Repeat Request (HARQ) in a communication system, the method comprising:
    decoding a retransmitted burst comprising a plurality of bits to determine if each bit in the retransmitted burst is error free, wherein a transmission error check is performed on the retransmitted burst to determine if each bit in the retransmitted burst is error free;

storing the retransmitted burst in a memory when at least one bit of the retransmitted burst is in error, wherein at least one of a memory address of the retransmitted burst and information corresponding to the retransmitted burst is recorded in a location table, wherein the location table records memory addresses and information corresponding to a plurality of bursts stored in the memory; and generating a combined burst using each of the retransmitted burst and at least one preceding burst when at least one bit of the retransmitted burst comprises error, wherein the combined burst comprises the plurality of bits.

18. A receiver for managing memory using Hybrid Automatic Repeat Request (HARQ) in a communication system, the receiver comprising:

a memory to store a retransmitted burst, the retransmitted burst comprising a plurality of bits, wherein at least one of a memory address of the retransmitted burst and information corresponding to the retransmitted burst is recorded in a location table, wherein the location table records memory addresses and information corresponding to a plurality of bursts stored in the memory; and a combining module coupled to the memory and configured to generate a combined burst using the retransmitted burst and at least one preceding burst when the at least one preceding burst is stored in the memory, wherein the retransmitted burst is retransmitted for the at least one preceding burst, wherein the combined burst comprises the plurality of bits.

19. The receiver of claim 18, wherein the combining module is configured to soft combine the retransmitted burst and the at least one preceding burst to generate the combined burst.

20. The receiver of claim 19, wherein the combining module is configured to:

extract the retransmitted burst from the memory using a corresponding memory address stored in the location table; and extract the at least one preceding burst from the memory using a corresponding memory address stored in the location table.

21. The receiver of claim 18 further comprising a decoding module coupled to the memory, the decoding module configured to decode the retransmitted burst to check each bit in the retransmitted burst for error when the at least one preceding burst corresponding to the retransmitted burst is absent in the memory, wherein a transmission error check is performed on the retransmitted burst to check each bit for error.

22. The receiver of claim 21, wherein the decoding module is configured to decode the combined burst to determine if each bit in the combined burst is error free, wherein a transmission error check is performed on the combined burst to check each bit for error.

* * * * *